July 3,395,366

MODE SELECTIVE LASER STRUCTURE

Filed Sept. 19, 1963

INVENTORS
ELIAS SNITZER
DAVID A. LAMARRE
BY John P. Harvey
ATTORNEY

United States Patent Office 3,395,366
Patented July 30, 1968

3,395,366
MODE SELECTIVE LASER STRUCTURE
Elias Snitzer, Sturbridge, Mass., and David A. La Marre, Woodstock, Conn., assignors to American Optical Company, Southbridge, Mass., a corporation of Delaware
Filed Sept. 19, 1963, Ser. No. 309,957
1 Claim. (Cl. 331—94.5)

ABSTRACT OF THE DISCLOSURE

Laser structures for providing lower order waveguide modes of energy distribution at increased output intensities.

This invention relates to lasers, and particularly to resonant laser structures adapted to produce an intense output of coherent optical energy by stimulated photonic emission from active atoms in a body of laser material. In a more specific sense, the invention is directed to laser structures incorporating a laser material in a resonant cavity structure of optical waveguide type for effecting stimulated emission in a highly mode-selective manner.

Lasers are employed for many purposes as sources of coherent optical energy. In various applications of laser devices, it is important to obtain a coherent light output of very high intensity. The intensity of the laser output is determined by the power output per unit solid angle of output beam spread; thus, to achieve a desirably high laser light output intensity the total power output of the laser should be high and the output beam spread angle should be small.

It has been proposed to provide a very narrow beam output by employing, in a resonant laser structure, a body of laser material of optical waveguide configuration (such as an optical fiber) having a very small cross-sectional dimension. The parameters of the optical fiber design can be selected to limit the number of propagation modes in which light of the laser emissive wavelength can propagate through the fiber laser body, and thus to restrict the development of significant stimulated emission in the body to light in those modes which have wave fronts moving in a direction parallel (or very nearly parallel) to the long axis of the laser body. Such parallelism of wave front movement of the emitter light affords a very narrow output beam. However, the total power output of a laser structure is directly related to the total volume of laser material in which stimulated emission occurs. The restriction on laser material volume imposed by the small cross-sectional dimension of the fiber design as required for propagation-mode stimulation control ordinarily limits the total power output of a fiber laser to a comparatively low value. On the other hand, increase in the fiber diameter (to provide a larger volume of laser material and thus a higher power output) impairs the mode-selective effect of the fiber by allowing propagation to occur in a larger number of modes, thereby enlarging the output beam spread angle.

It is accordingly an object of the present invention to provide a resonant laser structure of optical waveguide type wherein stimulated emission produces a large total power output yet is effected in a highly mode-selective manner to afford an advantageously narrow laser beam having high output light intensity.

Figure 1:
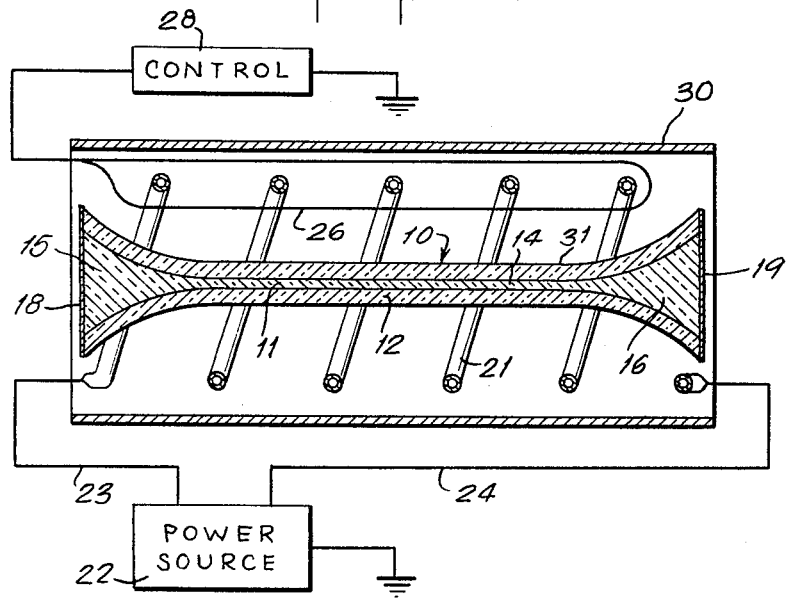
Figure 2:
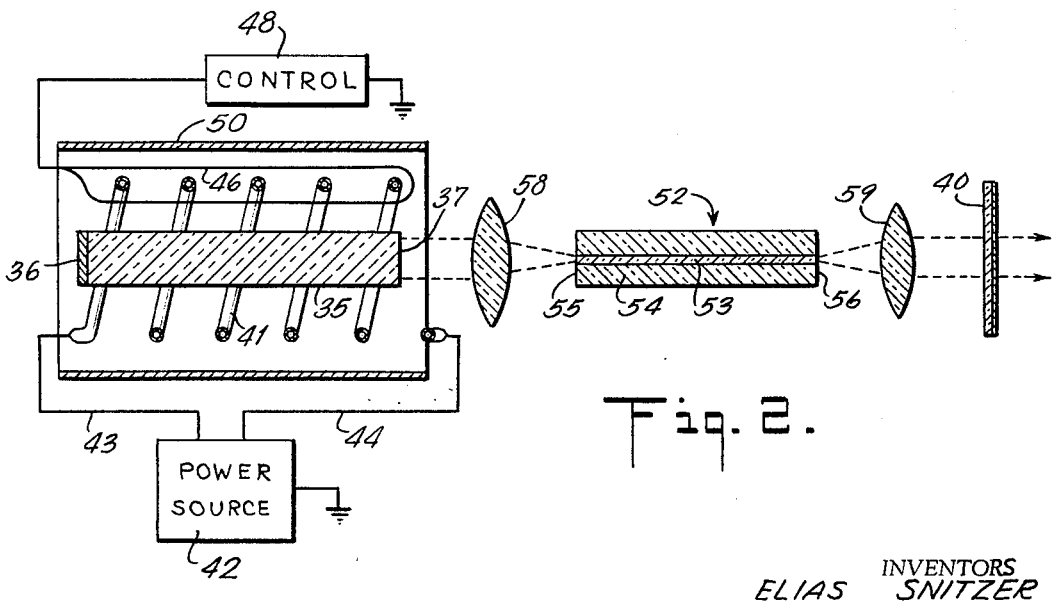

Further objects and advantages of the invention will be apparent from the detailed description hereinbelow set forth, together with the accompanying drawings, wherein:

FIG. 1 is a schematic sectional view of a laser structure embodying the present invention in a particular form; and FIG. 2 is a schematic sectional view of another embodiment of the invention.

The structure of the present invention generally includes, within a resonant wave-energy propagation path, a mode-selective optical dielectric waveguide path segment and a further path segment comprising a large volume of active laser material. The mode-selective path segment may take various forms, for example such as a clad fiber or a thin clad plate having a transverse dimension (thickness) selected to support only the desired lower-order modes for light incident edgewise on the plate and propagating therethrough. Again the invention may be embodied in various forms of laser devices including solid-state lasers arranged for pulsed output operation, and also lasers adapted to produce a continuous coherent light output. A solid-state laser structure arranged for pulsed operation and including a clad fiber form of mode-selective path segment will be hereinafter specifically described by way of example of a particular form of the invention.

Referring first to FIG. 1, the structure there shown includes a laser element 10 comprising a core 11 fabricated of a suitable solid laser material such as synthetic crystalline ruby or neodymium-doped glass and having a cladding 12 of light-transmissive material (such as glass) which has a refractive index lower than that of the core material for laser emissive light energy. The core 11 is an integral, axially rectilinear body having a circular cross-sectional configuration throughout. The cladding 12 surrounds the core laterally for its entire length in intimate engagement with the side surface of the core.

As a particular feature of the invention, the core 11 tapers inwardly at each end so as to provide an elongated and smooth-sided central portion 14 of uniform small diameter positioned between enlarged end portions 15, 16 each having a progressively increasing diameter in the direction away from the central portion. Specifically, the central portion 14 of the core with the associated portion of the cladding 12 is in the form of a clad optical fiber, while the enlarged end portions 15, 16 are each of larger-than-fiber dimension and together constitute a relatively large volume of active laser material.

A clad optical fiber, such as that formed by the core portion 14 and cladding 12 in FIG. 1, defines an elongated light-propagation path of small transverse dimension. The boundary of this propagation path is established at the side surface of the core, which being clad with a material having a refractive index lower than that of the core provides a condition of so-called total internal reflection at the core-cladding interface. If the core diameter is comparable in magnitude to the wavelength of light propagating therethrough, the clad fiber exhibits the properties of an optical dielectric waveguide; in such case the modes in which the light will propagate through the core are related to the core diameter, the ratio between the refractive indices of the core and cladding, and the frequency of the light. In particular, each given propagation mode of higher order than the lowest order ($HE_{11}$) mode is said to have a cut-off frequency above which propagation in the given mode is supported and below which propagation is severely attenuated. This means that light can propagate through the core in a given mode (other than the $HE_{11}$ mode) only if its frequency is above the cut-off value for that mode; and conversely, for any given frequency there exists a core diameter at which such frequency is below the cut-off value of every mode except the $HE_{11}$ mode.

In accordance with the foregoing principles, the core diameter in the portion 14 of FIG. 1 is selected to support only a very limited number of lower-order propagation modes at the frequency of laser emissive light energy, preferably including only modes for light waves propagating in a direction parallel (or very nearly parallel) to the long axis of the core. Indeed, if desired for very high mode selectivity, the core portion 14 may be dimensioned to support only the $HE_{11}$ mode which has a wavefront perpendicular to and moving axially of the portion 14. Fiber design parameters effective to accomplish this result for any given frequency of laser emissive light energy will be readily apparent to those skilled in the art.

The end faces 18, 19 of the laser element 10 (at the respective extremities of the core end portions 15, 16) are plane, parallel, opposed surfaces perpendicular to the long axis of the core, and are reflectively coated (as with vacuum-evaporation deposited coatings of silver) to provide the termini of a resonant cavity coextensive with the core 11. One end face, such as the end face 19, is made partially light-transmissive to permit emission of the laser light output therethrough. To constitute a complete, operative laser structure, the laser element 10 is surrounded by a helical gas discharge flash tube 21 of a type conventionally used to provide pumping light energy for solid-state laser devices. This flash tube energized from a suitable power source 22 through leads 23, 24 connected to the end electrodes of the tube, is triggered by applying an electrical potential pulse to a trigger electrode 26 (which encircles the turns of the flash tube) from a control pulse source 28. An internally reflective sleeve 30 laterally surrounds the flash tube and element 10 to concentrate pumping light from the flash tube onto the surface of the latter element. It will be understood that the flash tube 21 and associated structures 22–30 may be entirely conventional in character and function, and thus need not be described in detail here.

In the operation of the laser device of FIG. 1, as in conventional solid-state laser operation, light is produced by photonic emission from active atoms of the laser material occurring incident to the transition of the atoms from an excited upper energy level to a terminal low energy level. Laser action producing a laser light output pulse can occur when the upper-level atomic population in the core exceeds the lower-level population in the core by an amount at least equal to a so-called threshold value determined by energy-loss factors in the cavity. This condition is termed a laserable inversion of energy states of the core. Initiation of gaseous discharge in the flash tube serves to establish the requisite upper level population for laser action by providing a pulse of pumping light energy (including light in wavelengths of at least one absorption band of the laser material) which enters the laser core and by absorption of photonic energy causes active atoms of the laser material to shift in a series of interlevel transitions from an initial low energy level to the aforementioned upper level. Light produced by spontaneous emissive transitions of individual upper level atoms in the core, and reflected back and forth through the core between the resonant cavity termini, then induces similar light-emissive transitions of other upper-level atoms in such manner as to produce a fast-rising bi-directionally reflected pulse of coherent monochromatic light within the core. A portion of this latter pulse emerges through the partially transmissive end face 19 in one or a succession of laser output light pulses continuing until the inversion of energy states in the core falls again below the threshold value.

The modes in which this output light energy is emitted (and thus the beam spread of the output pulse) are determined by the character and configuration of the laser resonant cavity, and in particular by the parameters of the core fiber portion 14. It will be appreciated that individual excited atoms in a body of laser material may emit light in any of a very large number of modes, including modes for plane waves propagating parallel to the long axis of the body and modes for waves propagating at various angles thereto. To the extent that light emitted in any particular mode induces emissive transitions of other upper level atoms, the induced emission occurs in the same mode. However, significant stimulated emission (providing laser light output) can develop only in modes for which energy-loss factors in the cavity are low, and in which light can reflect back and forth through the cavity, since light in all other modes is attenuated or dissipated before it can induce massive emissive transitions of upper-level atoms.

Thus in the structure of FIG. 1, significant stimulated emission in the core 11 can occur only in modes supported by the fiber core portion 14, for only in such modes can light propagate through the core to reflect back and forth between the cavity ends. All other light is attenuated in the portion 14 or dissipated out of the cavity as through the cladding 12. To prevent light in the cladding from being reflected back into the core from the interface between the cladding and the surrounding air, the outer surface 31 of the cladding may be etched or otherwise roughened to render it non-specular yet transmissive to pumping light energy from the flash tube 21.

Since, as explained above, the core portion 14 is designed and dimensioned to support only selected lower-order modes for waves propagating in a direction substantially parallel to the long axis of the core (and indeed, with special advantage, preferably only the $HE_{11}$ mode), stimulated emission occurs only in the latter modes even in the enlarged core end portions 15, 16. Consequently the beam spread of the laser light output is verry narrow, as in the case of some other fiber laser constructions providing comparable mode selectivity. However, since this mode-selective stimulated emission occurs not only in the core portion 14 but also in the large volume of laser material comprising the end portions 15, 16, the total power output of the laser (concentrated in the selected modes, and thus in a very narrow beam) is advantageously large. This combination of large power output and narrow beam spread provides a laser light output of desirably high intensity.

An alternative form of resonant laser structure embodying the invention is illustrated in FIG. 2. The structure of FIG. 2 includes a rod-shaped laser element 35 of comparatively large diameter (such as a conventionally dimensioned solid-state laser rod), fabricated of a suitable solid laser material and having plane, opposed parallel end faces 36, 37 perpendicular to the long axis of the rod. The end face 36 is silvered to provide a first reflective resonant cavity terminus. The second terminus of the resonant cavity structure is provided by a reflectively coated (silvered) plane glass plate 40, positioned in spaced parallel relation to the uncoated rod end face 37. This plate 40 is partially light-transmissive, to permit emission of the laser light output therethrough.

To provide pumping light energy for the laser rod 35, the structure includes a helical flash tube 41, disposed to surround the rod concentrically and energized from a power source 42 through leads 43, 44. Initiation of pumping light pulses from the flash tube is controlled by a trigger electrode 46 which is connected to a suitable control pulse potential source 48. A cylindrical internally reflective shield 50 concentrically surrounds the rod and flash tube to concentrate pumping light from the flash tube onto the surface of the rod. It will be appreciated that the flash tube 41 and associated elements 42–50 are analgous in arrangement and function to the corresponding elements of the device of FIG. 1.

The structure of FIG. 2 further includes an optical fiber 52 disposed in the resonant cavity structure in coaxial relation to the laser rod 35 and intermediate the uncoated rod end face 37 and the reflective plate 40. This fiber comprises an axially rectilinear small-diameter core 53 of light-transmissive material and laterally surrounded by a cladding 54 of material having (for laser emissive light energy) a refractive index lower than that of the core material to provide total internal reflection at the core-cladding interface. The ends of the fiber are opposed, plane, parallel surfaces 55, 56, perpendicular to the long axis of the core.

As in the case of the fiber portion 14 in FIG. 1, this fiber 52 is designed and dimensioned to support only selected lower-order modes of propagation for light of laser emissive wave-length, and by way of example may be designed to support only the lowest order ($HE_{11}$) mode. A first lens or lens system 58, preferably having a non-reflective coating, is positioned intermediate the laser rod end face 37 and the fiber end face 55 to focus light emerging from the laser rod onto the proximate end of the fiber core 53; and a second lens 59, also preferably having a non-reflective coating, is positioned between the fiber end 56 and the reflective plate 40, to focus light reflected from the plate onto the fiber core.

In this structure, the large-diameter laser rod 35, like the enlarged core end portions 15, 16 of FIG. 1, provides a large volume of active laser material defining a first segment of the resonant propagation path extending between the resonant cavity termini while the fiber core 53 provides a second and mode-selective segment of the path in a manner analogous to the central core portion 14 of FIG. 1. Thus, although the fiber core in FIG. 2 is not an integral part of the active laser element (and thus is not necessarily fabricated of laserable material), the structure of FIG. 2 is generally similar in character and function to that of FIG. 1.

Specifically, when laser action is initiated in the structure of FIG. 2 by the triggering of a pumping light pulse from the flash tube 41, a coherent laser light output pulse (emerging through the plate 40) is produced by stimulated emission from upper-level atoms in the rod 35. Significant stimulated emission can occur in the rod only in those modes of propagation in which light is reflected back and forth through the cavity between the reflective rod end face 36 and the plate 40. Since the fiber 52 provides a segment of the resonant propagation path between these cavity termini, and attenuates all but the selected low-order mode or modes mentioned above, bidirectional light reflection in the cavity is restricted to light in the latter mode or modes. Consequently stimulated emission in the rod producing a laser light output can develop only in these selected modes, with the result that the laser light output is mode-selected in characer and accordingly has a desirably small ouput beam spread angle. At the same time, the total power output of the laser structure is desirably large (although confined within this narrow beam) because of the large volume of laser material (the rod 35) in which the mode-selective stimulated emission occurs. Hence the structure of FIG. 2, like that of FIG. 1, provides a laser light output of advantageously superior intensity and small beam spread angle.

It is to be understood that the invention is not limited to the features and embodiments hereinabove specifically set forth, but may be carried out in other ways without departure from its spirit.

We claim:

1. A laser structure for generating substantially only the lowest order optical dielectric waveguide mode of coherent light output at laser emission frequency and at relatively high light intensity, said structure comprising an elongated central portion and a pair of enlarged end portions of outwardly diverging cross sections terminating in flat end surfaces in integral and optically aligned relation to each other, a pair of plane reflectors disposed in parallel spaced facing relation to each other upon the opposite ends of said end portions and defining an optical resonant cavity and wave-energy propagation path therebetween and arranged to extend centrally longitudinally through said structure, said central portion comprising a fiber optical dielectric waveguide of considerable length and comprising a relatively thin elongated core, said core being formed of solid active laser material and having a predetermined refractive index, said end portions each comprising a relatively large mass of active laser material centrally thereof and integral with said laser core material and extending outwardly laterally of said propagation path, the transverse dimensions of said end portions being materially greater than the transverse dimension of said core so as to provide adjacent each end of said structure a relatively large mass of active laser material through which said wave-energy propagation path extends between said end reflectors, and a cladding of solid dielectric material having a predetermined refractive index which is less than the index of said core disposed in surrounding relation to said elongated core throughout the length thereof and along the outer side wall surfaces of said enlarged end portions of laser material, the propagation path parameters for said dielectric waveguide comprising said central core diameter, the ratio of core-to-cladding refractive indices, and the frequency of energy at the laser emission wavelength, said parameters being so related to each other as to allow propagation longitudinally through the core from one end reflector to the other of substantially only the lowest order mode of optical energy propagation, at least one of said reflectors being slightly transmissive, whereby a large total mass of active laser material for providing stimulated laser emission at materially increased power output will be provided and such output will be, due to the dielectric waveguide characteristics of said central portion, of substantially the lowest order mode propagation and together will provide a very material increase in the intensity of coherent light emitted from said structure at relatively small solid angle.

References Cited

UNITED STATES PATENTS

| | | | |
|---|---|---|---|
| 3,137,827 | 6/1964 | Pierce | 331—94.5 |
| 3,157,726 | 11/1964 | Hicks | 350—96 |
| 3,289,100 | 11/1966 | Masters et al. | 331—94.5 |

OTHER REFERENCES

Collins: "Interferometric Laser Mode Selector" Lasers and Applications, Nov. 7, 1962, pp. 96–108.

Snitzer: "Proposed Fiber Cavities for Optical Masers," Jour. of Appl. Phys., vol. 32, No. 1, January 1961, pp. 36–39.

JEWELL H. PEDERSEN, *Primary Examiner.*

R. L. WIBERT, *Assistant Examiner.*